(12) United States Patent
Dai et al.

(10) Patent No.: US 12,002,389 B2
(45) Date of Patent: Jun. 4, 2024

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Wanli Dai, Wuhan (CN); Zhen Tang, Wuhan (CN); Yuxin Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 612 days.

(21) Appl. No.: 17/267,016

(22) PCT Filed: Jun. 18, 2020

(86) PCT No.: PCT/CN2020/096702
§ 371 (c)(1),
(2) Date: Feb. 8, 2021

(87) PCT Pub. No.: WO2021/248530
PCT Pub. Date: Dec. 16, 2021

(65) Prior Publication Data
US 2022/0189346 A1 Jun. 16, 2022

(30) Foreign Application Priority Data

Jun. 9, 2020 (CN) .......................... 202010517217.5

(51) Int. Cl.
*G09F 9/30* (2006.01)

(52) U.S. Cl.
CPC .................................... *G09F 9/301* (2013.01)

(58) Field of Classification Search
CPC ...... G09F 9/301; G06F 1/1626; G06F 1/1652; G06F 1/16; H04M 1/0269; H04M 1/0268
See application file for complete search history.

(56) References Cited

U.S. PATENT DOCUMENTS

| 8,330,900 B2* | 12/2012 | Kuo | ........................ G09F 9/301 345/1.3 |
| 8,873,225 B2* | 10/2014 | Huitema | ................. G09F 9/301 345/169 |

(Continued)

FOREIGN PATENT DOCUMENTS

| CN | 108183980 A | 6/2018 |
| CN | 108269495 A | 7/2018 |

(Continued)

*Primary Examiner* — Rockshana D Chowdhury
*Assistant Examiner* — Martin Antonio Asmat Uceda
(74) *Attorney, Agent, or Firm* — PV IP PC; Wei Te Chung; Zhigang Ma (57) ABSTRACT

A display panel and a display device are provided. The display panel includes a flat display region and an edge display region that are connected to each other and can be relatively bent. The edge display region includes a first bending portion and a second bending portion that can be relatively bent, and the second bending portion is disposed at opposite ends of the first bending portion. The above design can realize a multi-sided display on a front, sides, and corners of the display panel, and is easy to assemble with other components of the display device and save manufacturing cost.

19 Claims, 7 Drawing Sheets

(56) References Cited

U.S. PATENT DOCUMENTS

| | | | | |
|---|---|---|---|---|
| 10,288,973 B1* | 5/2019 | Gupta | ............ | G02F 1/167 |
| 2003/0234343 A1* | 12/2003 | Cok | ............ | H01L 27/14603 |
| | | | | 348/E5.135 |
| 2010/0277665 A1* | 11/2010 | Kuo | ............ | G02F 1/13336 |
| | | | | 349/73 |
| 2018/0164850 A1* | 6/2018 | Sim | ............ | G06F 1/1647 |
| 2018/0366664 A1 | 12/2018 | Fujioka et al. | | |
| 2020/0057525 A1* | 2/2020 | Prest | ............ | H04R 3/12 |

FOREIGN PATENT DOCUMENTS

| | | | | |
|---|---|---|---|---|
| CN | 108766977 A | 11/2018 | | |
| CN | 110853518 A * | 2/2020 | ............ | G09F 9/301 |
| CN | 110853518 A | 2/2020 | | |
| CN | 110870001 A | 3/2020 | | |
| CN | 111199996 A | 5/2020 | | |
| TW | 201513071 A * | 4/2015 | | |

\* cited by examiner

DISPLAY PANEL AND DISPLAY DEVICE

CROSS REFERENCE TO RELATED APPLICATIONS

This application is a Notional Phase of PCT Patent Application No. PCT/CN2020/096702 having international filing date of Jun. 18, 2020, which claims priority to Chinese patent application No. 202010517217.5, titled "Display Panel and Display Device" filed on Jun. 9, 2020 with the National Intellectual Property Administration, which is incorporated by reference in the present application in its entirety.

FIELD OF INVENTION

The present invention relates to the field of display technologies, and in particular, to a display panel and a display device.

BACKGROUND OF INVENTION

With expansion of the display devices application field, display devices are no longer limited to requirements of flat displays. There are now device designs that require multi-sided display, such as double-curved displays and quad-curved displays that have appeared on the market. However, current design solutions for multi-sided display require multiple cutting and splicing of display screens, which are prone to problems such as poor cutting accuracy, high cutting difficulty, and low splicing accuracy, and then affecting overall aesthetics of the display screens and display effect, and thus need to be improved.

Technical Problem

Current design solutions for multi-sided display require multiple cutting and splicing of display screens, in processes of cutting and splicing, it is prone to problems such as poor cutting accuracy, high cutting difficulty, and low splicing accuracy, which seriously affects production efficiency and product quality of the display screens.

Technical Solution

In order to solve the above technical problems, solutions provided by the present invention are as follows:

The present invention provides a display panel comprising a flat display region and an edge display region, wherein the edge display region is disposed on at least one edge of the flat display region;

wherein the edge display region comprises a first bending portion and a second bending portion;

the first bending portion is directly connected to the at least one edge of the flat display region and is bendable relative to the flat display region;

the first bending portion comprises a first end connected to the flat display region, a second end and a third end adjacent to the first end, a fourth end opposite to the first end, and the second end is opposite to the third end; and the second bending portion is connected to the second end and the third end of the first bending portion and is bendable relative to the first bending portion.

In the display panel of present invention, the edge display region is seamlessly connected to the flat display region, and a picture is displayed normally at a connection between the edge display region and the flat display region.

In the display panel of present invention, the second bending portion and the first bending portion are seamlessly connected, and a picture is normally displayed at a connection between the second bending portion and the first bending portion.

In the display panel of present invention, a bending angle of the first bending portion relative to the flat display region ranges from 0 degrees to 180 degrees.

In the display panel of present invention, a bending angle of the second bending portion relative to the first bending portion ranges from 0 degrees to 180 degrees.

In the display panel of present invention, the edge display region comprises a first edge display region, a second edge display region, a third edge display region, and a fourth edge display region, which are respectively disposed on four edges of the flat display region, the first edge display region is opposite to the third edge display region, and the second edge display region is opposite to the fourth edge display region.

In the display panel of present invention, corners of the flat display region are curved corners.

In the display panel of present invention, a distance that the second bending portion extends from the first bending portion is a length of the second bending portion; and a sum of the lengths of the two adjacent second bending portions of the two adjacent edge display regions is equal to a circumference of the curved corners of the flat display region.

In the display panel of present invention, the length of the second bending portion of the two adjacent edge display regions is equal or unequal.

In the display panel of present invention, a connection of the two adjacent second bending portions of the two adjacent edge display regions is a complementary tooth structure.

In the display panel of present invention, a connection of the two adjacent second bending portions of the two adjacent edge display regions is a complementary curved structure.

In the display panel of present invention, a distance that the second bending portion extends from the first bending portion is a length of the second bending portion; and a sum of the lengths of the two adjacent second bending portions of the two adjacent edge display regions is less than a circumference of the curved corners of the flat display region.

The present invention further provides a display device comprising a display panel and a support frame for supporting the display panel;

wherein the display panel comprises a flat display region and an edge display region, and the edge display region is disposed on at least one edge of the flat display region;

the edge display region comprises a first bending portion and a second bending portion;

the first bending portion is directly connected to the at least one edge of the flat display region, and is bendable relative to the flat display region;

the first bending portion comprises a first end connected to the flat display region, a second end and a third end adjacent to the first end, and a fourth end opposite to the first end, and the second end is opposite to the third end;

the second bending portion is connected to the second end and the third end of the first bending portion and is bendable relative to the first bending portion; and the flat display region covers a front of the support frame, and the edge display region covers sides of the support frame.

In the display device of present invention, the edge display region comprises a first edge display region, a second edge display region, a third edge display region, and a fourth edge display region, which are respectively disposed on four edges of the flat display region, the first edge display region is opposite to the third edge display region, and the second edge display region is opposite to the fourth edge display region;

a distance that the second bending portion extends from the first bending portion is a length of the second bending portion; and a sum of the lengths of the two adjacent second bending portions of the two adjacent edge display regions is equal to a circumference of curved corners of the flat display region.

In the display device of present invention, the display device further comprises a light guide provided in a connection region of the two adjacent second bending portion of the two adjacent edge display regions.

In the display device of present invention, the light guide is used to provide a display function at a connection of the two intersecting second bending portions.

In the display device of present invention, a connection of the two adjacent second bending portions of the two adjacent edge display regions is a complementary tooth structure or a complementary curved structure.

In the display device of present invention, the edge display region comprises a first edge display region, a second edge display region, a third edge display region, and a fourth edge display region, which are respectively disposed on four edges of the flat display region, the first edge display region is opposite to the third edge display region, and the second edge display region is opposite to the fourth edge display region;

a distance that the second bending portion extends from the first bending portion is a length of the second bending portion; and a sum of the lengths of the two adjacent second bending portions of the two adjacent edge display regions is less than a circumference of curved corners of the flat display region.

In the display device of present invention, the display device further comprises a functional component or a decorative component disposed between the two adjacent second bending portions of the two adjacent edge display regions.

The present invention further provides a display device comprising a display panel and a support frame for supporting the display panel;

wherein the display panel comprises a flat display region and an edge display region, and the edge display region is disposed on at least one edge of the flat display region;

the edge display region comprises a first bending portion and a second bending portion, the first bending portion is directly connected to the at least one edge of the flat display region and is bendable relative to the flat display region;

the first bending portion comprises a first end connected to the flat display region, a second end and a third end adjacent to the first end, and a fourth end opposite to the first end, and the second end is opposite to the third end;

the second bending portion is connected to the second end and the third end of the first bending portion and is bendable relative to the first bending portion;

the flat display region covers a front of the support frame, and the edge display region covers sides of the support frame; and a light guide is provided in a connection region of the two adjacent second bending portion, and the light guide is used to provide a display function at a connection of the two intersecting second bending portions.

BENEFICIAL EFFECT

A display panel and a display device provided by the present invention comprise a flat display region and an edge display region that can be relatively bent, and two ends of the edge display region are designed to be bent twice, thereby realizing a multi-sided display on a front, sides, and corners of the display panel. In addition, an overall structure of the display panel is simple, an integration is better, an overall display effect is better, and it is easy to assemble with other components of the display device and saves manufacturing cost.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

The following description of the various embodiments is provided with reference to the accompanying drawings. Directional terms, such as upper, lower, front, back, left, right, inner, outer, and lateral side, mentioned in the present invention are only for reference. Therefore, the directional terms are used for describing and understanding rather than limiting the present invention. In the figures, units having similar structures are used for the same reference numbers.

Embodiments of the present invention provide a display panel and a display device. By designing the display panel to comprise a flat display region and an edge display region that can be relatively bent, and designing both ends of the edge display region to be bendable twice, thereby achieving multi-sided display of the display device and simplifying a structure of the display panel, optimizing an appearance and display effect of the display device.

Figure 1:
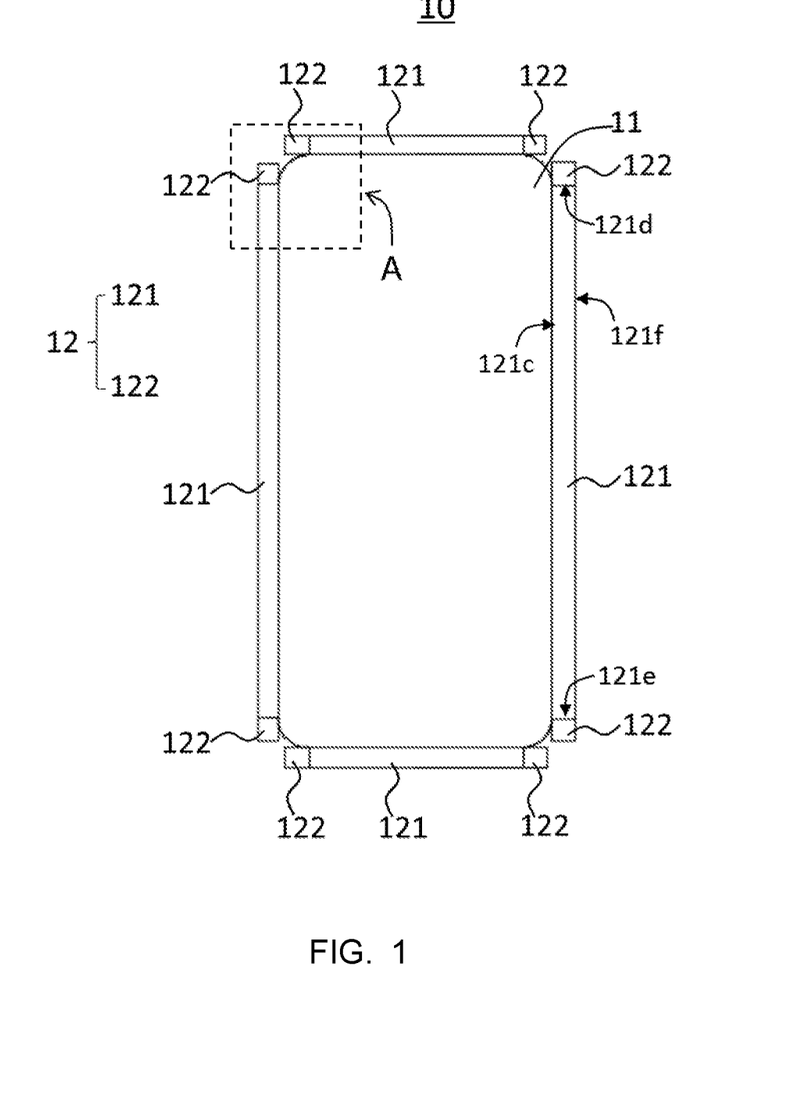
FIG. 1 is a schematic plan structural view of a display panel provided by an embodiment of the present invention.
Figure 2:
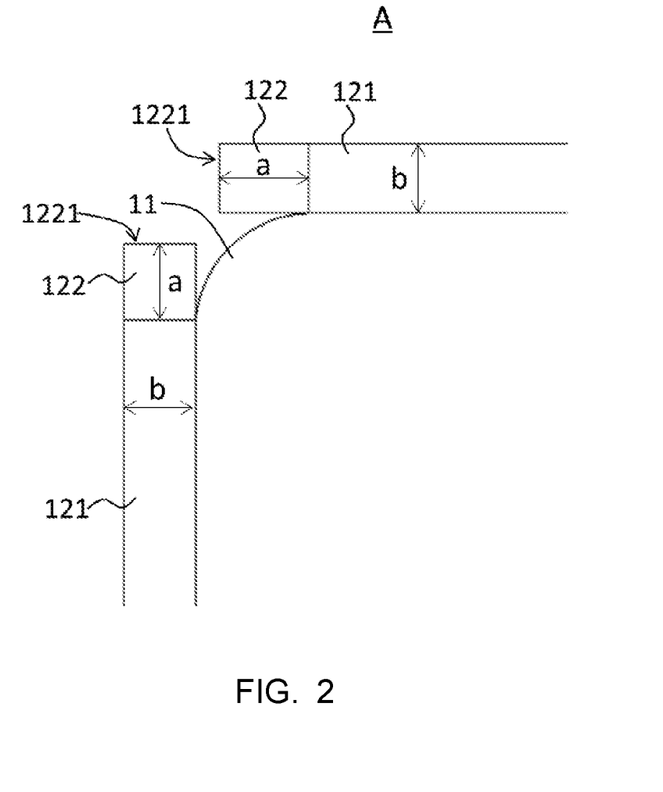
FIG. 2 is a partial schematic view of an area A in the display panel 10 shown in FIG. 1.
Figure 3:
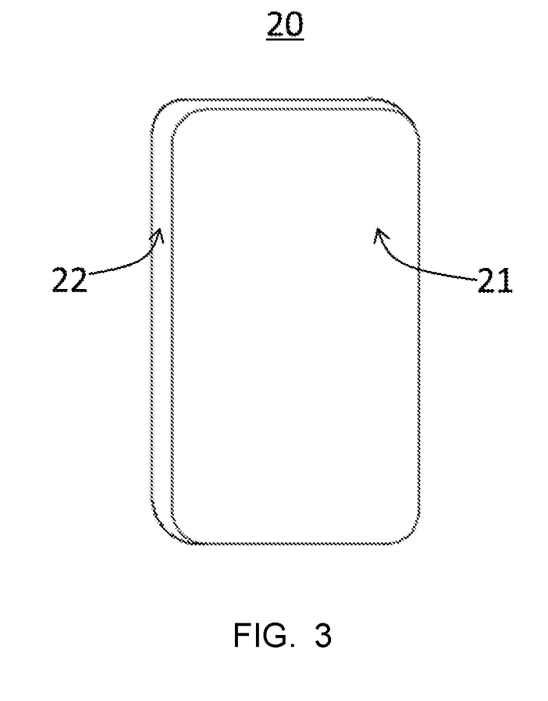
FIG. 3 is a schematic structural view of a support frame provided by the embodiment of the present invention.
Figure 4:
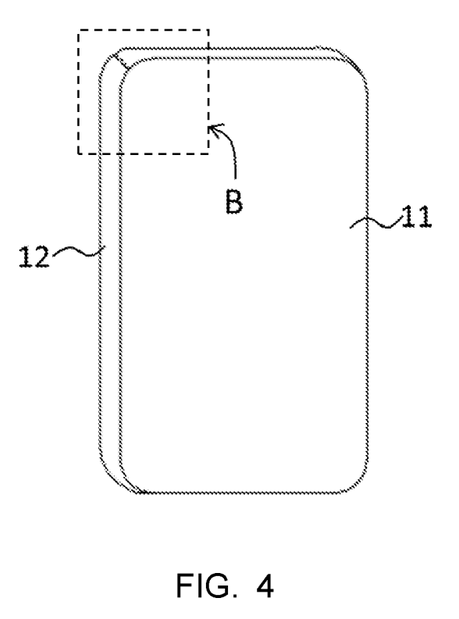
FIG. 4 is a schematic structural view of a display device provided by the embodiment of the present invention.

As shown in FIG. 1 and FIG. 2. FIG. 1 is a schematic plan structural view of the display panel provided by the embodiment of the present invention, and FIG. 2 is a partial schematic view of an area A in the display panel 10 shown in FIG. 1. The display panel 10 comprises a flat display region 11 and an edge display region 12, and the edge display region 12 is disposed on at least one edge of the flat display region 11. It should be noted that the display panel 10 described in the present invention may be an organic light emitting diode display panel or a liquid crystal display panel or other forms of display panels. The present invention focuses on protecting configuration of the display panel without limiting types of the display panel. Optionally, the flat display region 11 may be a flexible display panel or a non-flexible display panel. At least a part of the edge display region 12 is a flexible display panel.

The edge display region 12 is seamlessly connected with the flat display region 11, and a picture is normally displayed at a connection. The edge display region 12 is bendable relative to the flat display region 11. Specifically, the edge display region 12 may be bent toward a back side of the flat display region 11 relative to the flat display region 11, and its bending angle relative to the flat display region 11 may range from 0 degrees to 180 degrees. Through the above arrangement, the multi-dimensional stereoscopic display effect of the display panel 10 can be achieved, which greatly improves an overall aesthetic appearance of the display panel 10.

Optionally, the edge display region 12 may be a set of display regions disposed only on one edge of the flat display region 11, or a plurality of display regions disposed on any two sides of the flat display region 11, or any three or four edges of the flat display region 11, which may be freely selected herein according to actual design requirements. It should be understood that a more faceted display of the display panel 10 can be achieved by setting up more sets of the edge display regions 12.

Further, the edge display region 12 comprises a first bending portion 121 and a second bending portion 122. The first bending portion 121 is directly connected to the edge of the flat display region 11 and is bendable relative to the flat display region 11. That is, the first bending portion 121 can be bent toward the back side of the flat display region 11 relative to the flat display region 11, and its bending angle relative to the flat display region 11 can range from 0 degrees to 180 degrees.

In order to facilitate the description of a relative positional relationship between the flat display region 11, the first bending portion 121, and the second bending portion 122, the embodiment is defined as follows: The first bending portion 121 comprises a first end 121c connected to the flat display region 11, a second end 121d and a third end 121e adjacent to the first end 121c, a fourth end 121f opposite to the first end 121c, and the second end 121d is opposite to the third end 121f. It should be noted that the first bending portion 121 is regarded as a flat structure shown in the drawings, regardless of an end of a three-dimensional structure.

Further, the second bending portion 122 is connected to the second end 121d and the third end 121e of the first bending portion 121 and is bendable relative to the first bending portion 121. It should be noted that the second bending portion 122 and the first bending portion 121 are seamlessly connected, and a picture is normally displayed at a connection. Alternatively, the second bending portion 122 may be bent toward a back side of the first bending portion 121 relative to the first bending portion 121, and its bending angle relative to the first bending portion 121 may range from 0 degrees to 180 degrees.

Optionally, the second bending portion 122 may be a flexible display panel to adapt to different corner shapes of the display panel 10.

It should be understood that through a structural arrangement of the first bending portion 121 and the second bending portion 122 of the above-mentioned edge display region 12, normal display on sides and corners of the display panel 10 can be achieved, thereby realizing its multi-sided display function. Moreover, an overall structure of the display panel 10 is simple, an integration is better, an overall display effect is better, and it is easy to assemble with other components of the display device and saves manufacturing cost.

Optionally, the edge display region 12 comprises four sets of display regions respectively disposed on four edges of the flat display region 11, which are a first edge display region, a second edge display region, a third edge display region, and a fourth edge display region. The first edge display region is opposite to the third edge display region, and the second edge display region is opposite to the fourth edge display region. Therefore, the second bending portion 122 of the first edge display region is bent opposite to the second bending portion 122 of the second edge display region, the second bending portion 122 of the second edge display region is bent opposite to the second bending portion 122 of the third edge display region, the second bending portion 122 of the third edge display region is bent opposite to the second bending portion 122 of the fourth edge display region, the second bending portion 122 of the fourth edge display region is bent opposite to the second bending portion 122 of the first edge display region, and thus to form a display structure covering each corner of the display panel 10, thereby achieving multi-sided display on the sides and corners of the display panel 10.

Optionally, the corner of the flat display region 11 is a curved corner. It should be noted that the curved corners described here are for the flat structure shown in the drawing, regardless of thicknesses of the display panel, and the curved corners have a smoother appearance and more comfortable visual effects than square corners.

In order to clearly illustrate dimensional characteristics of the first bending portion 121 and second bending portion 122 of the edge display region 12, the following definition is now made: A distance that the second bending portion 122 extends from the first bending portion 121 is a length of the second bending portion 122, that is, a length a in the drawing. A common width of the first bending portion 121 and the second bending portion 122 is a width b in the drawing.

Optionally, a sum of the lengths of the two adjacent second bending portions 122 of the two adjacent edge display regions 12 is equal to a circumference of the curved corners of the flat display region 11. Thus, the second bending portion 122 completely covers the curved corners of the flat display region 11 after bending. Optionally, the length a of the second bending portion 122 of the two adjacent edge display regions 12 may be equal or different.

Figure 5:
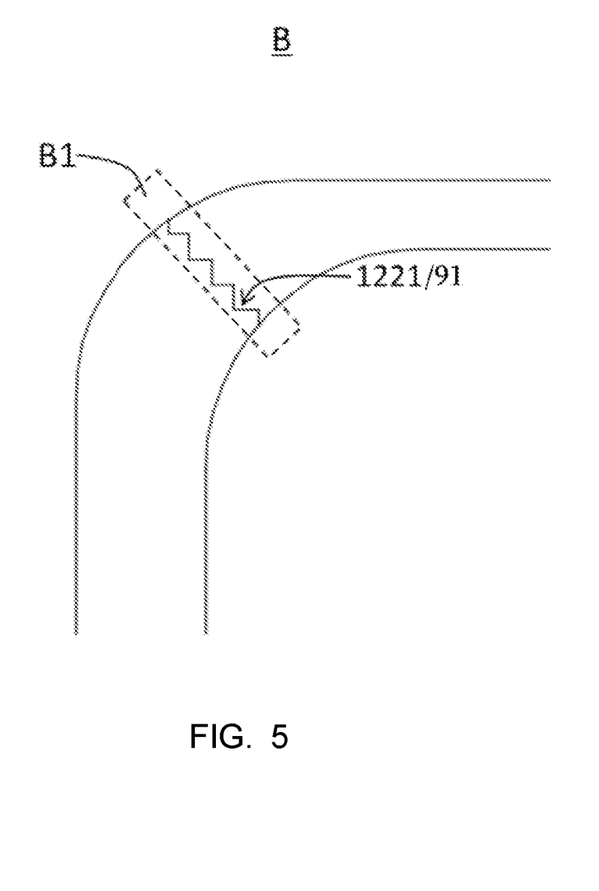
FIG. 5 is a partial schematic view of an area B of the embodiment of the display device shown in FIG. 4.
Figure 6:
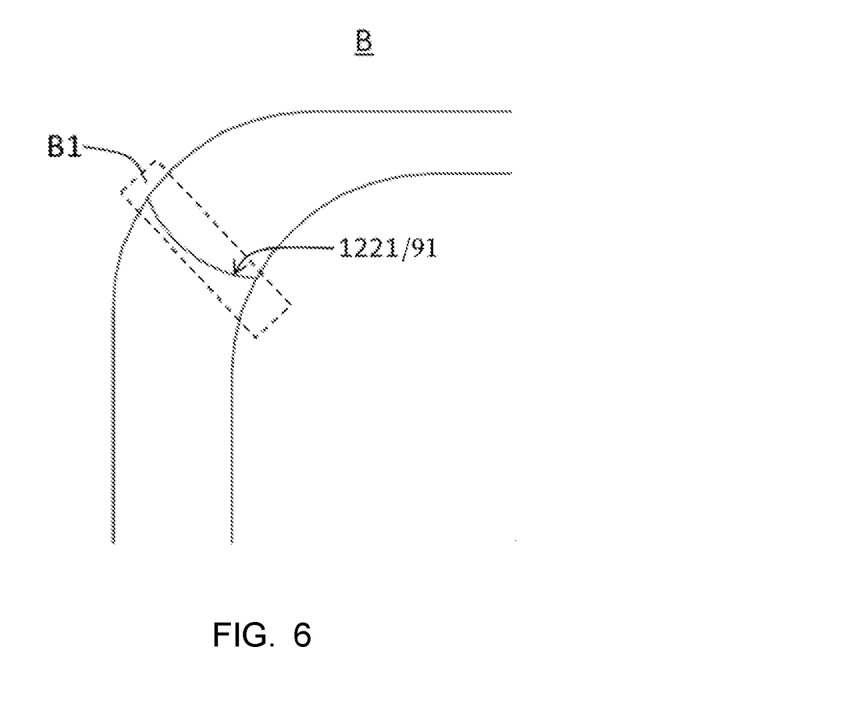
FIG. 6 is a partial schematic view of the area B of another embodiment of the display device shown in FIG. 4.
Figure 7:
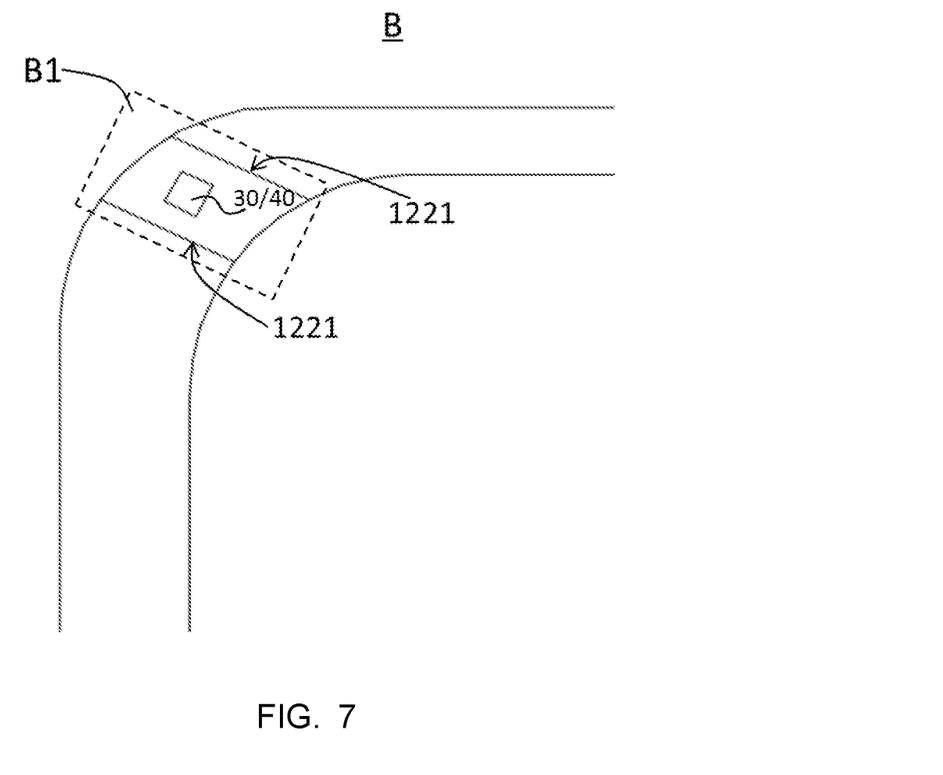
FIG. 7 is a partial schematic view of the area B of yet another embodiment of the display device shown in FIG. 4.

Further, a connection 1221 of the two adjacent second bending portions 122 of the two adjacent edge display regions 12 is a complementary tooth structure (refer to FIG. 5) or curved structure (refer to FIG. 6), and thus forms a variety of handover shapes. A shape of the connection 1221 of the tooth structure or the curved structure is favorable for a fitting and fixing of the two adjacent second bending portions 122.

Alternatively, the sum of the lengths a of the two adjacent second bending portions 122 of the two adjacent edge display regions 12 may also be smaller than the circumference of the curved corners of the flat display region 11. Thus, the second bending portion 122 is bent to form a section of uncovered region of the display panel. When manufacturing the display device, other functional components or decorative components may be disposed in the uncovered region.

In summary, the display panel provided by the embodiments of the present invention comprises the flat display region and the edge display region that can be relatively bent, and the two ends of the edge display region are designed to be bent twice, thereby realizing the multi-sided display on a front, sides, and corners of the display panel. In addition, the overall structure of the display panel is simple, the integration is better, the overall display effect is better, and it is easy to assemble with the other components of the display device and saves the manufacturing cost.

The embodiments of the present invention further provide a display device, as shown in FIG. 3 to FIG. 7, and refer to the display panel structure shown in FIG. 1 and FIG. 2. The display device comprises the display panel 10 described in the above embodiment and a support frame 20 for supporting the display panel 10. The support frame 20 comprises a front 21 and sides 22. The flat display region 11 of the display panel 10 covers the front 21 of the support frame 20, and the edge display region 12 of the display panel 10 covers the sides 22 of the support frame 20. The display panel 10 and the support frame 20 are attached to each other, and combined with other functional components or decorative components to form the display device.

Optionally, the sum of the lengths a of the two adjacent second bending portions 122 of the two adjacent edge display regions 12 of the display panel 10 used in the display device is equal to the circumference of the curved corners of the flat display region 11, that is, the display panel 10 can completely wrap the front 21, the sides 22, and the corners of the side 22 of the support frame 20. The display device further comprises a light guide provided in a connection region B1 of the two adjacent second bending portions 122 of the two adjacent edge display regions 12. The light guide is used to make the connection 1221 of the two second bending portions 122 that intersect with each other have a display function, so as to weaken a trace of the connection 1221 and make the display device display a seamless image.

Optionally, according to a specific shape of the connection 1221, the light guide can be adaptively designed. For example, when the connection 1221 is the complementary tooth structure (refer to FIG. 5), the light guide 91 has a tooth shape suitable for it. When the connection 1221 is the curved structure (refer to FIG. 6), the light guide 91 is a curved shape suitable for it.

Alternatively, the sum of the lengths a of the two adjacent second bending portions 122 of the two adjacent edge display regions 12 of the display panel 10 used in the display device is smaller than the circumference of the curved corners of the flat display region 11, thereby forming a section of uncovered region of the display panel in the corners of the display device. The display device further comprises a functional component 30 or a decorative component 40 disposed between the two adjacent second bending portions 122 of the two adjacent edge display regions 12 (that is, the region B1 shown in FIG. 7). The functional component 30 may be a device such as a jack, an indicator light, a power amplifier, etc., in order to perfect function settings of the display device. The decorative component 40 can be personalized with decorative lights, decorative patterns, etc. to enrich an overall beauty of the display device.

In summary, the display device provided by the embodiments of the present invention comprise the display panel provided by the embodiments of the present invention. Combined with structural features of the display panel, the display device can realize multi-sided display on the front, sides, and corners thereof, and has a simple structure, better integration, easy assembly, and good overall display effect.

It should be noted that although the present invention is disclosed as above with specific embodiments, the above embodiments are not intended to limit the present invention. Those of ordinary skill in the art can make various changes and modifications without departing from the spirit and scope of the present invention, so a protection scope of the present invention is subject to a scope defined by the claims.

What is claimed is:

1. A display panel, comprising:
a flat display region and an edge display region, wherein the edge display region is disposed on at least one edge of the flat display region;
wherein the edge display region comprises a first bending portion and a second bending portion;
the first bending portion is directly connected to the at least one edge of the flat display region and is bendable relative to the flat display region;
the first bending portion comprises a first end connected to the flat display region, a second end and a third end adjacent to the first end, a fourth end opposite to the first end, and the second end is opposite to the third end; and
the second bending portion is connected to the second end and the third end of the first bending portion and is bendable relative to the first bending portion,
wherein the display panel comprises a light guide provided in a connection region of the two adjacent second bending portions of two adjacent edge display regions, a shape of the light guide corresponds to a shape of the connection region.

2. The display panel as claimed in claim 1, wherein the edge display region is seamlessly connected to the flat display region, and a picture is displayed normally at a connection between the edge display region and the flat display region.

3. The display panel as claimed in claim 1, wherein the second bending portion and the first bending portion are seamlessly connected, and a picture is normally displayed at a connection between the second bending portion and the first bending portion.

4. The display panel as claimed in claim 1, wherein a bending angle of the first bending portion relative to the flat display region ranges from 0 degrees to 180 degrees.

5. The display panel as claimed in claim 1, wherein a bending angle of the second bending portion relative to the first bending portion ranges from 0 degrees to 180 degrees.

6. The display panel as claimed in claim 1, wherein the edge display region comprises a first edge display region, a second edge display region, a third edge display region, and a fourth edge display region, which are respectively disposed on four edges of the flat display region, the first edge display region is opposite to the third edge display region, and the second edge display region is opposite to the fourth edge display region.

7. The display panel as claimed in claim 6, wherein the corners of the flat display region are curved corners.

8. The display panel as claimed in claim 7, wherein a distance that the second bending portion extends from the first bending portion is a length of the second bending portion; and
a sum of the lengths of the two adjacent second bending portions of the two adjacent edge display regions is equal to a circumference of the curved corners of the flat display region.

9. The display panel as claimed in claim 8, wherein the length of the second bending portion of the two adjacent edge display regions is equal or unequal.

10. The display panel as claimed in claim 8, wherein a connection of the two adjacent second bending portions of the two adjacent edge display regions is a complementary tooth structure.

11. The display panel as claimed in claim 8, wherein a connection of the two adjacent second bending portions of the two adjacent edge display regions is a complementary curved structure.

12. The display panel as claimed in claim 7, wherein a distance that the second bending portion extends from the first bending portion is a length of the second bending portion; and
a sum of the lengths of the two adjacent second bending portions of the two adjacent edge display regions is less than a circumference of the curved corners of the flat display region.

13. A display device, comprising:
a display panel and a support frame for supporting the display panel;
wherein the display panel comprises a flat display region and an edge display region, and the edge display region is disposed on at least one edge of the flat display region;
the edge display region comprises a first bending portion and a second bending portion;
the first bending portion is directly connected to the at least one edge of the flat display region, and is bendable relative to the flat display region;
the first bending portion comprises a first end connected to the flat display region, a second end and a third end adjacent to the first end, and a fourth end opposite to the first end, and the second end is opposite to the third end;
the second bending portion is connected to the second end and the third end of the first bending portion and is bendable relative to the first bending portion; and
the flat display region covers a front of the support frame, and the edge display region covers a side of the support frame,
wherein the display panel comprises a light guide provided in a connection region of the two adjacent second bending portions of two adjacent edge display regions, a shape of the light guide corresponds to a shape of the connection region.

14. The display device as claimed in claim 13, wherein the edge display region comprises a first edge display region, a second edge display region, a third edge display region, and a fourth edge display region, which are respectively disposed on four edges of the flat display region, the first edge display region is opposite to the third edge display region, and the second edge display region is opposite to the fourth edge display region;
a distance that the second bending portion extends from the first bending portion is a length of the second bending portion; and
a sum of the lengths of the two adjacent second bending portions of the two adjacent edge display regions is equal to a circumference of curved corners of the flat display region.

15. The display device as claimed in claim 13, wherein the light guide is used to provide a display function at a connection of the two intersecting second bending portions.

16. The display device as claimed in claim 13, wherein a connection of the two adjacent second bending portions of the two adjacent edge display regions is a complementary tooth structure or a complementary curved structure.

17. The display device as claimed in claim 13, wherein the edge display region comprises a first edge display region, a second edge display region, a third edge display region, and a fourth edge display region, which are respectively disposed on four edges of the flat display region, the first edge display region is opposite to the third edge display region, and the second edge display region is opposite to the fourth edge display region;
a distance that the second bending portion extends from the first bending portion is a length of the second bending portion; and
a sum of the lengths of the two adjacent second bending portions of the two adjacent edge display regions is less than a circumference of curved corners of the flat display region.

18. The display device as claimed in claim 17, further comprising a functional component or a decorative component disposed between the two adjacent second bending portions of the two adjacent edge display regions.

19. A display device, comprising:
a display panel and a support frame for supporting the display panel;
wherein the display panel comprises a flat display region and an edge display region, and the edge display region is disposed on at least one edge of the flat display region;
the edge display region comprises a first bending portion and a second bending portion, the first bending portion is directly connected to the at least one edge of the flat display region and is bendable relative to the flat display region;
the first bending portion comprises a first end connected to the flat display region, a second end and a third end adjacent to the first end, and a fourth end opposite to the first end, and the second end is opposite to the third end;
the second bending portion is connected to the second end and the third end of the first bending portion and is bendable relative to the first bending portion;
the flat display region covers a front of the support frame, and the edge display region covers a side of the support frame; and
a light guide is provided in a connection region of the two adjacent second bending portion, and the light guide is used to provide a display function at a connection of the two intersecting second bending portions, wherein the display panel comprises a light guide provided in a connection region of the two adjacent second bending portions of two adjacent edge display regions, a shape of the light guide corresponds to a shape of the connection region.

\* \* \* \* \*